US 8,422,810 B2

(12) United States Patent
Choi et al.

(10) Patent No.: US 8,422,810 B2
(45) Date of Patent: Apr. 16, 2013

(54) METHOD OF REDUNDANT PICTURE CODING USING POLYPHASE DOWNSAMPLING AND THE CODEC USING THE METHOD

(75) Inventors: Hae Chul Choi, Daejeon (KR); Jae Gon Kim, Daejeon (KR); Jin Woo Hong, Daejeon (KR); Hae-Kwang Kim, Seoul (KR); Jie Jia, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1412 days.

(21) Appl. No.: 11/996,172

(22) PCT Filed: Jul. 20, 2006

(86) PCT No.: PCT/KR2006/002854
§ 371 (c)(1),
(2), (4) Date: Mar. 6, 2008

(87) PCT Pub. No.: WO2007/032597
PCT Pub. Date: Mar. 22, 2007

(65) Prior Publication Data
US 2008/0199094 A1    Aug. 21, 2008

(30) Foreign Application Priority Data

Jul. 20, 2005 (KR) .................. 10-2005-0065570
Oct. 11, 2005 (KR) .................. 10-2005-0095221
Jul. 18, 2006 (KR) .................. 10-2006-0067094

(51) Int. Cl.
*G06K 9/36* (2006.01)
(52) U.S. Cl.
USPC ..................... 382/251; 375/240.03
(58) Field of Classification Search ............. 382/251; 375/240.03
See application file for complete search history.

(56) References Cited

U.S. PATENT DOCUMENTS

| | | | | |
|---|---|---|---|---|
| 5,647,008 A | * | 7/1997 | Farhangi et al. | 381/119 |
| 6,301,299 B1 | * | 10/2001 | Sita et al. | 375/240.01 |
| 6,501,861 B1 | | 12/2002 | Cho et al. | |
| 6,571,017 B1 | * | 5/2003 | Boon | 382/236 |

FOREIGN PATENT DOCUMENTS

| | | |
|---|---|---|
| KR | 19970009378 | 2/1997 |
| WO | 9841029 | 9/1998 |

OTHER PUBLICATIONS

JVT; "Draft Test of Final Draft International Standard for Advanced Video Coding (ITU-T Rec. H.264 | ISO/IEC 14496-10 AVC)", International Organisation for Standardisation Organisation Internationale De Normalisation ISO/IEC JTC 1/SC 29/WG 11 Coding of Moving Pictures and Audio; N5555, Pattaya, Mar. 2003, pp. 1-251.
International Search Report—Mailed Oct. 27, 2006.

* cited by examiner

*Primary Examiner* — Sath V Perungavoor
*Assistant Examiner* — Jeffery Williams
(74) *Attorney, Agent, or Firm* — Ladas & Parry LLP

(57) ABSTRACT

Provided are a method for redundant slice coding by polyphase down-sampling (PD) and a codec using the method. An encoder for redundant slice coding by PD includes a PD coding unit rearranging a residual block that is a difference between a current block and a prediction block into four sections by performing PD on the residual block, a quantization transform unit transforming and quantizing at least one of the sections of the residual block, and a reference block generation unit generating a reference block based on a value obtained by performing inverse transform and inverse quantization, and then inverse PD on the at least one transformed and quantized section by the quantization transform unit.

26 Claims, 16 Drawing Sheets

8 X 8 RESIDUAL BLOCK (BEFORE PD)
(a)

8 X 8 RESIDUAL BLOCK (AFTER PD)
(b)

8 X 8 RESIDUAL BLOCK (BEFORE INVERSE PD)    8 X 8 RESIDUAL BLOCK (AFTER INVERSE PD)

8 x 8 RESIDUAL BLOCK (after PD)    RECONSTRUCTED 8 X 8 RESIDUAL BLOCK

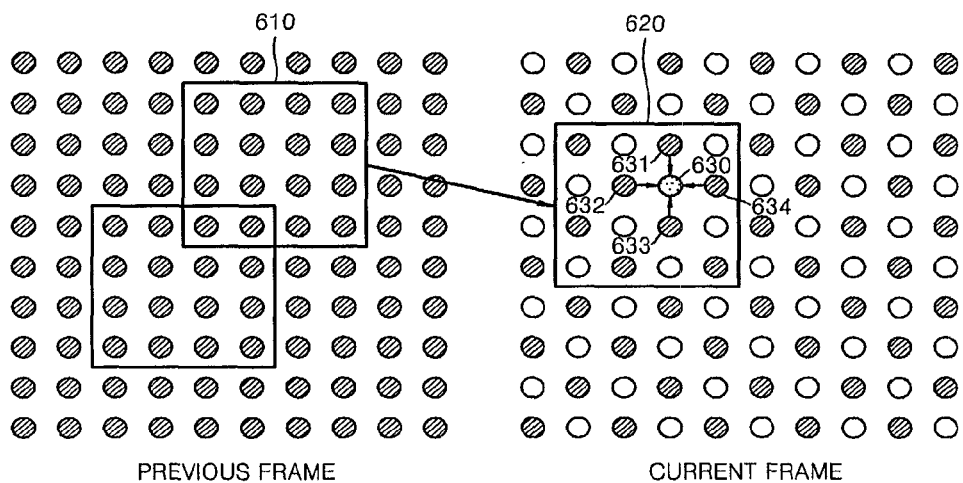

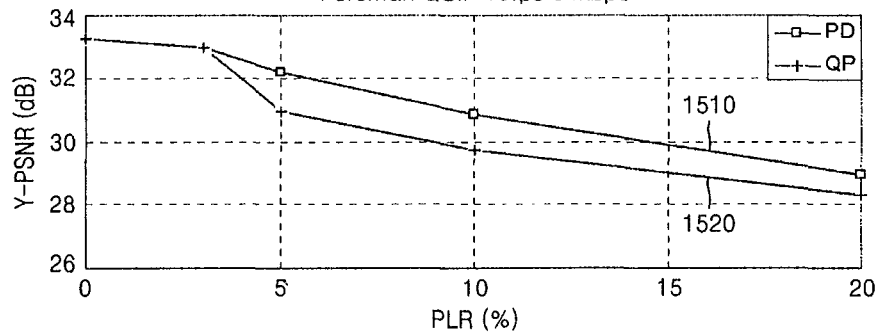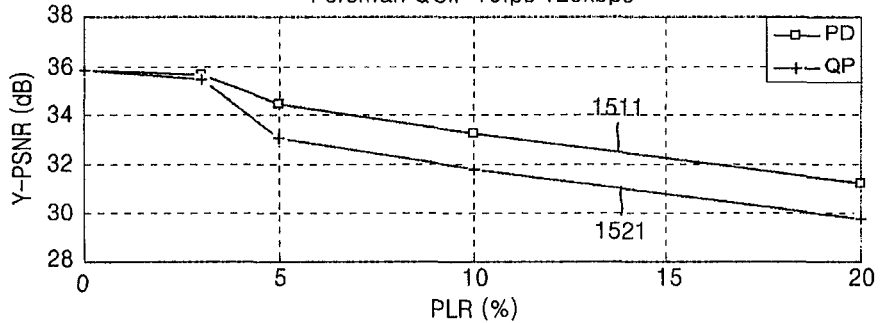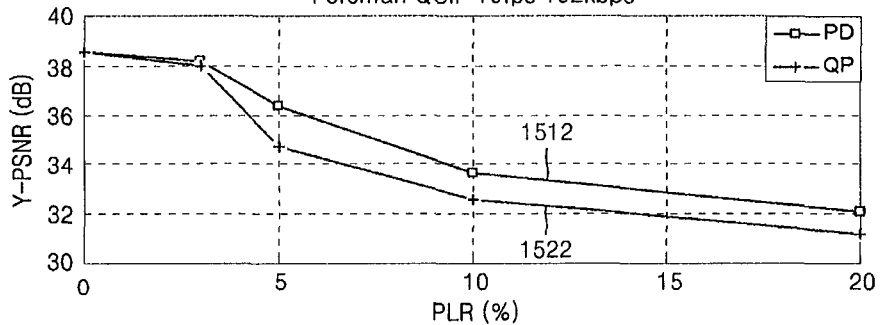

FIG. 19
(a)
(b)
(c)

METHOD OF REDUNDANT PICTURE CODING USING POLYPHASE DOWNSAMPLING AND THE CODEC USING THE METHOD

TECHNICAL FIELD

The present invention relates to an encoder and a decoder for redundant slice coding by polyphase down-sampling (PD) in a Joint Scalable Video Model (JSVM).

BACKGROUND ART

Redundant slices effectively improve the robustness of Advanced Video Coding (AVC) (Text of ISO/IEC FDIS 14496-10; Advanced Video Coding; N5555, March 2003) from packet loss.

The redundant slices can be coded by simply repeating primary slices, which results in significantly decreasing the coding efficiency.

DESCRIPTION OF THE DRAWINGS

FIG. 6 illustrates the reconstruction concept of a pixel in redundant slice coding by PD, according to an embodiment of the present invention;

FIG. 7 illustrates a change in a picture parameter set RBSP syntax according to an embodiment of the present invention;

FIG. 8 illustrates an indication of a redundant_pic_type in a Joint Scalable Video Model (JSVM) encoder configuration file;

FIGS. 15A through 15D illustrate a comparison between the performance of redundant slice coding by PD, according to the present invention and the performance of QP-based coding in an environment having an error (Foreman, QCIF, 10 fps), according to an embodiment of the present invention;

FIGS. 19A through 19C illustrates a comparison between the display qualities of reconstructed pictures in a Foreman sequence in the case when the packet loss rate (PLR) is 10%, according to an embodiment of the present invention.

DETAILED DESCRIPTION OF THE INVENTION

Technical Problem

Figure 1:
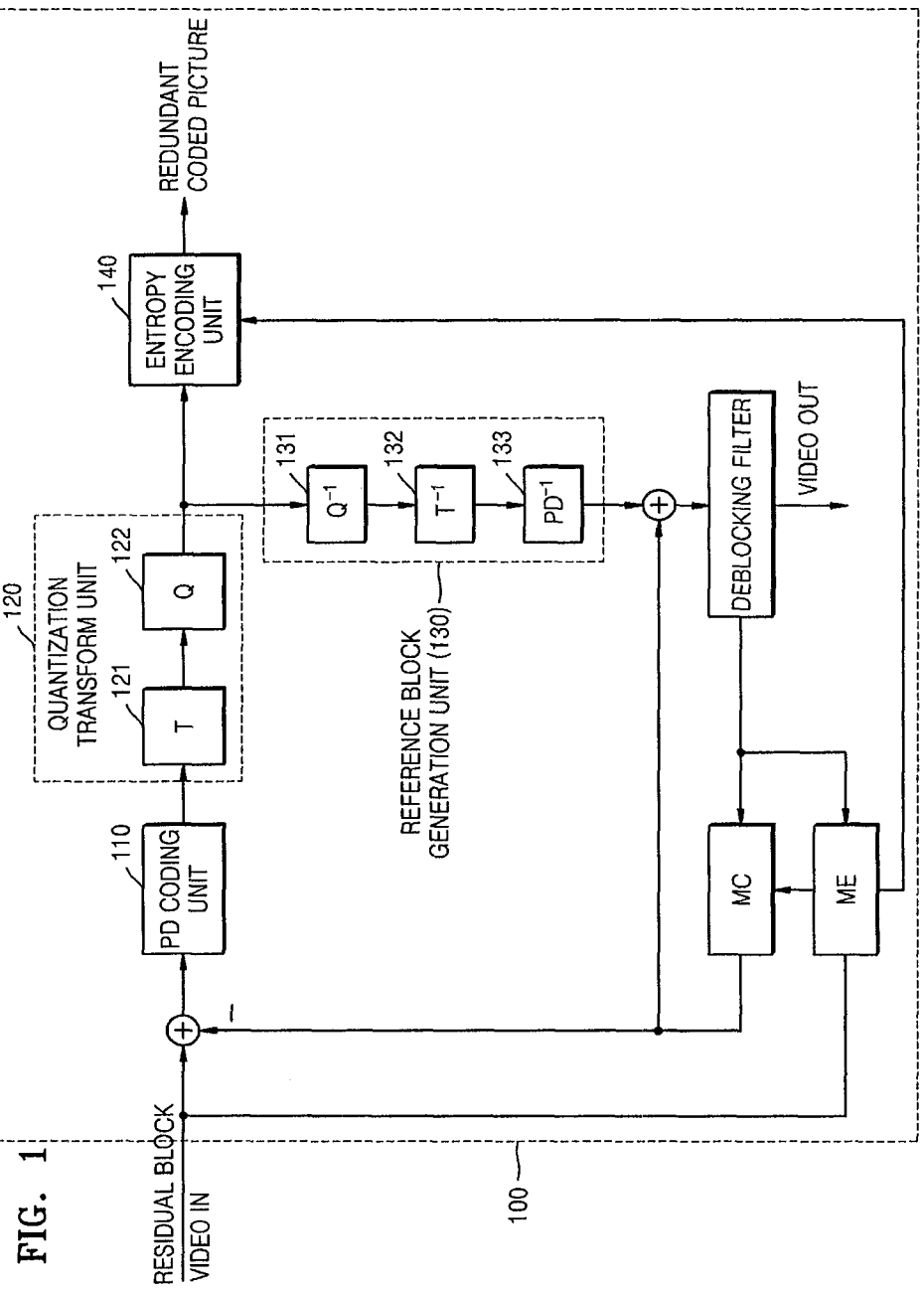
FIG. 1 is a block diagram illustrating an encoder for redundant slice coding by polyphase down-sampling (PD) according to an embodiment of the present invention.

To solve the problem, a redundant picture is presented using the smallest number of bits by being coded with a changed parameter, e.g., a changed quantization coefficient. However, the display quality of a reconstructed picture of the redundant picture coded with a larger quantization coefficient decreases resulting in a loss of detailed information.

Technical Solution

The present invention provides a redundant slice coding method by polyphase down-sampling (PD) in a Joint Scalable Video Model (JSVM), in which error resilience of a switched virtual circuit (SVC) and coding efficiency increase by changing the number of discrete cosine transform (DCT) coefficients that are to be transmitted.

The present invention also provides a redundant slice coding method by PD, wherein if some of the DCT coefficients in a single redundant slice are transmitted, reconstruction is performed using spatial redundancy between neighboring pixels, thereby improving reconstruction quality.

Advantageous Effects

As described above, according to the present invention, by using redundant slice coding by PD in JSVM, the amount of DCT coefficients to be transmitted is adaptively changed, thereby improving error resilience of SVC and coding efficiency.

Furthermore, when some of the DCT coefficients in a single redundant slice are transmitted, reconstruction is performed using spatial redundancy between neighboring pixels, thereby improving reconstruction quality.

In addition, the present invention can also be applied to a codec that does not perform DCT. In other words, by removing the DCT and an inverse transform from the codec of the present invention, the present invention is applied to a pixel level having residual information of brightness or color values, thereby improving error resilience.

Moreover, according to the present invention, since a redundant slice of the same quality can be coded using a lesser amount of bits, the bandwidth of a network can be more efficiently used.

Also, reconstruction using spatial redundancy between neighboring pixels for a case where some of the DCT coefficients are transmitted can be applied to error concealment for a primary coded picture having an error as well as decoding of a redundant slice.

BEST MODE

According to an aspect of the present invention, there is provided an encoder for redundant slice coding by polyphase down-sampling (PD), the encoder comprising: a PD coding unit rearranging a residual block that is a difference between a current block and a prediction block into four sections by performing PD on the residual block; a quantization transform unit transforming and quantizing at least one of the sections of the residual block; and a reference block generation unit generating a reference block based on a value obtained by performing inverse transform and inverse quantization, and then inverse PD on the at least one transformed and quantized section by the quantization transform unit.

According to another aspect of the present invention, there is provided a decoder for redundant slice coding by polyphase down-sampling (PD), the decoder comprising: a receiving unit receiving a bitstream including a coefficient that is obtained by rearranging a residual block into four sections by PD coding and performing transform and quantization, and then entropy encoding on at least one of the sections of the residual block from an encoder; a PD inverse coding unit performing entropy-decoding, inverse quantization, and inverse transform on the bitstream and performing inverse PD on the at least one section of the residual block for reconstruction; and a decoding unit reconstructing sections of the residual block which are not received from the encoder based on the at least one section reconstructed by the PD inverse coding unit and a previously decoded frame.

According to another aspect of the present invention, there is provided a codec for redundant slice coding by polyphase down-sampling (PD), the codec comprising: a PD coding unit rearranging a residual block into four sections by performing PD coding on the residual block; a coding unit performing coding by sequentially performing a transform, quantization, and entropy-coding on at least one of the sections; a PD inverse coding unit performing entropy-decoding, inverse quantization, and inverse transform, and then inverse PD on the at least one encoded section; and a decoding unit reconstructing sections of the residual block that are not encoded based on the at least one section that is reconstructed by the PD inverse coding unit and a previously decoded frame.

According to another aspect of the present invention, there is provided a method for redundant slice coding by polyphase down-sampling (PD), the method comprising: rearranging a residual block that is a difference between a current block and a prediction block into four sections by performing PD on the residual block; transforming at least one of the sections; quantizing the at least one transformed section; and generating a reference block based on a value obtained by performing inverse transform and inverse quantization, and then inverse PD on the at least one transformed and quantized section.

According to another aspect of the present invention, there is provided a method for redundant slice decoding by polyphase down-sampling (PD), the method comprising: receiving a bitstream including a coefficient that is obtained by rearranging a residual block into four sections by PD and performing transform and quantization, and then entropy encoding on at least one of the sections from an encoder; performing inverse PD on the at least one section after performing entropy-decoding and inverse quantization, and inverse transform on the bitstream; and reconstructing sections of the residual block which are not received based on the at least one section on which the transform and quantization and the entropy encoding have been performed and a previously decoded frame.

According to another aspect of the present invention, there is provided a method for redundant slice coding by polyphase down-sampling (PD), the method comprising: rearranging a residual block into four sections by performing PD on the residual block; performing encoding by sequentially performing transform, quantization, and entropy-coding on at least one of the sections; performing inverse PD after performing the entropy-decoding, inverse quantization, and inverse transform on the at least one encoded section; and reconstructing sections of the residual block which are not encoded based on at least one reconstructed section and a previously decoded frame.

MODE OF THE INVENTION

Hereinafter, the present invention will be described in detail by explaining embodiments with reference to the accompanying drawings. In the drawings, like reference numerals denote elements performing like functions.

FIG. 1 is a block diagram illustrating an encoder 100 for redundant slice coding by polyphase down-sampling (PD) according to an embodiment of the present invention.

Redundant slice coding is effective for video communications that is resilient to packet loss and can be implemented by repeating slices or coding slices with different coding parameters. In the present embodiment, error resilience of a switched virtual circuit (SVC) and coding efficiency increase by performing redundant slice coding by PD.

The encoder 100 includes a PD coding unit 110, a quantization transform unit 120, a reference block generation unit 130, and an entropy encoding unit 140.

The PD coding unit 110 performs PD on a residual block through a difference between the current block and a prediction block in order to rearrange the residual block with four sections.

If a 4×4 transform block is used, a redundant slice coding method by PD applies PD on an 8×8 inter residual block that has not yet been processed by a discrete cosine transform (DCT).

Note that in the present embodiment, a redundant slice can be encoded using other redundant slice coding methods that follow the AVC standards.

For example, a picture can be encoded by both a PD-based method and a high quantization parameter (QP)-based method. In the latter case, a transformed coefficient is encoded with a high QP after undergoing PD and DCT.

Figure 3:
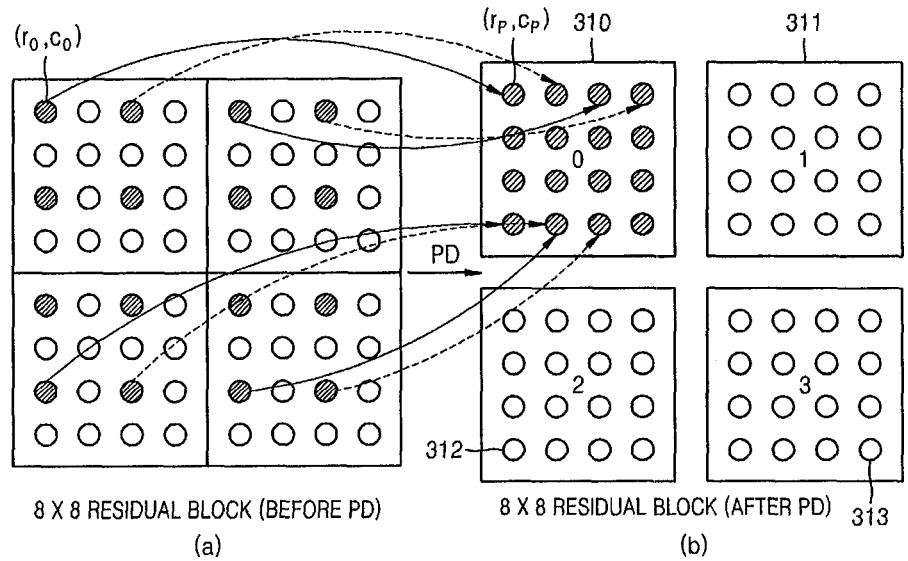
FIG. 3 illustrates an example of PD.

PD will be described in more detail with reference to FIG. 3. FIG. 3 illustrates an example of PD.

The quantization transform unit 120 includes a transform unit 121 for transforming at least one of the four sections of the rearranged residual block and a quantization unit 122 for quantizing the transformed sections.

The quantization transform unit 120 may selectively transform and quantize some of the sections of the residual block (see FIG. 3 (b)) that are rearranged after PD of the PD coding unit 110 according to an available bandwidth.

More specifically, N/4 of the residual block is adaptively coded. Here, N is a natural number between 1 and 4. For example, the quantization transform unit 120 transforms and quantizes at least one of the four sections (310, 311, 312, and 313 as illustrated in FIG. 3) of the residual block that is rearranged after PD. In this way, the encoder 100 generates different bitstreams corresponding to different bitrates.

The reference block generation unit 130 generates a reference block based on a value obtained by performing inverse quantization ($Q^{-1}$) and inverse transform ($T^{-1}$) on one section that has been transformed and quantized by the quantization transform unit 120 and then performs inverse polyphase down-sampling ($PD^{-1}$) on the result.

The reference block generation unit 130 sets the values of the pixels of the sections of the residual block that were not transformed and quantized by the quantization transform unit 120 to 0 and the pixels of the sections transformed and quantized by the quantization transform unit 120 to the values obtained by performing inverse quantization ($Q^{-1}$) and inverse transform ($T^{-1}$) and then inverse polyphase down-sampling ($PD^{-1}$). The reference block generation unit 130 then adds the residual block to a prediction block obtained from previously decoded images, thereby generate a reference block.

Figure 4A:
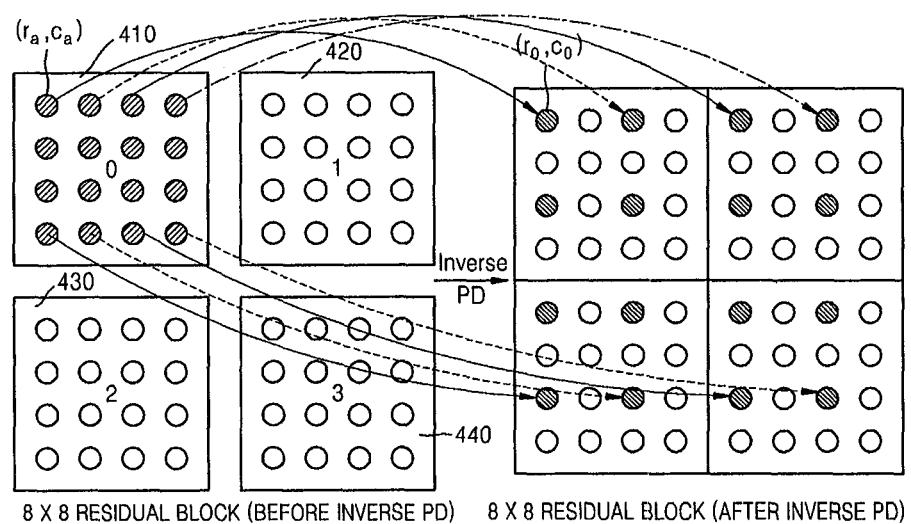
FIGS. 4A and 4B illustrate examples of inverse PD.
Figure 4B:
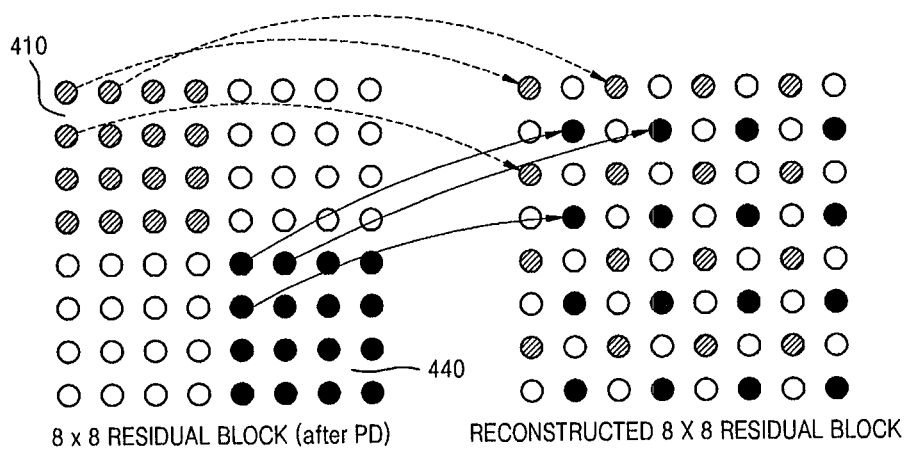

For example, the reference block generation unit 130 sets the values of the pixels (e.g., 0, 2, 4, 6, 8, 10, 12, and 14 as illustrated in FIG. 5A) of the sections of the residual block that were transformed and quantized by the quantization transform unit 120 to the values obtained by performing inverse quantization ($Q^{-1}$), inverse transform ($T^{-1}$) and then inverse polyphase down-sampling ($PD^{-1}$) and adds the residual block to a prediction block, thereby generate a reference block. Inverse polyphase down-sampling ($PD^{-1}$) will be described in more detail with reference to FIG. 4. FIGS. 4A and 4B illustrate examples of inverse PD.

The reference block generation unit 130 sets the values of the pixels (e.g., 1, 3, 5, 7, 9, 11, 13, and 15 as illustrated in FIG. 5A) of the sections of the residual block that were not transformed and quantized by the quantization transform unit 120 to 0 and adds the residual block to a prediction block, thereby generate a reference block.

The entropy encoding unit 140 performs entropy encoding based on the already transformed and quantized pixels from among the pixels of at least one section.

For example, if some (310 and 312 of FIG. 3) of the sections of the residual block that is rearranged by the PD coding unit 110 are transformed and quantized by the quantization transform unit 120, the entropy encoding unit 140 performs entropy encoding based on the temporally previously transformed and quantized pixels within the sections (310 and 312 of FIG. 3) that were transformed and quantized by the quantization transform unit 120. Entropy encoding will be described in more detail with reference to FIG. 5.

Figure 2:
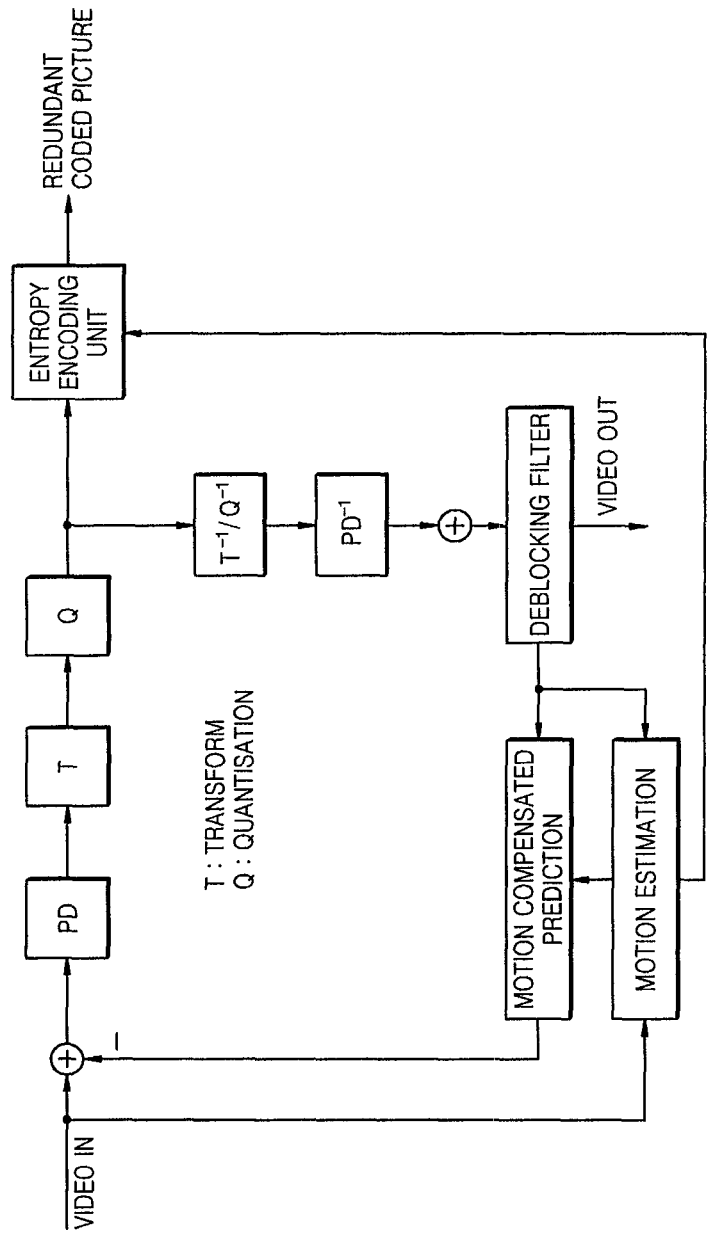
FIG. 2 is a block diagram illustrating an encoder for redundant slice coding by PD according to an embodiment of the present invention.

FIG. 2 is a block diagram illustrating an encoder for redundant slice coding by PD according to an embodiment of the present invention.

To facilitate understanding of PD that is used in the present invention, examples for explaining PD and inverse PD are shown in FIGS. 3, 4A, and 4B.

In the present invention, PD is applied to redundant slice coding. In redundant slice coding by PD of the present invention, lost samples can reasonably conceal an error occurrence from information of their neighboring samples and thus, error resilience can improve.

As shown in FIG. 3, PD rearranges the residual block into the four sections 310, 311, 312, and 313. The pixels ($r_0$, $c_0$) of the original residual block (a) are rearranged to the pixels ($r_p$, $c_p$) by PD.

A relationship between the pixels ($r_0$, $c_0$) and ($r_p$, $c_p$) is defined follows.

$$r_p = (r_0 \bmod 2)*4 + (r_0/2)$$

$$c_p = (c_0 \bmod 2)*4 + (c_0/2) \quad (1)$$

In FIG. 4A, when the quantization transform unit 120 transforms and quantizes only one section 410 of four sections 410, 420, 430, and 440 of a residual block, inverse PD is performed on the section 410.

In FIG. 4B, when the quantization transform unit 120 transforms and quantizes two sections 410 and 440 of the four sections 410, 420, 430, and 440 of the residual block, inverse PD is performed on section 410.

As shown in FIGS. 4A and 4B, when inverse PD is performed on at least one section that is transformed and quantized by the quantization transform unit 120, pixels ($r_a$, $c_a$) in the transformed and quantized section are returned to the original positions ($r_0$, $c_0$).

A relationship between the pixels ($r_0$, $c_0$) and ($r_a$, $c_a$) is defined as follows.

$$r_0 = 2*[r_a - (r_a/4)*4] + (r_a/4)$$

$$c_0 = 2*[c_a - (c_a/4)*4] + (c_a/4) \quad (2)$$

Figure 5:
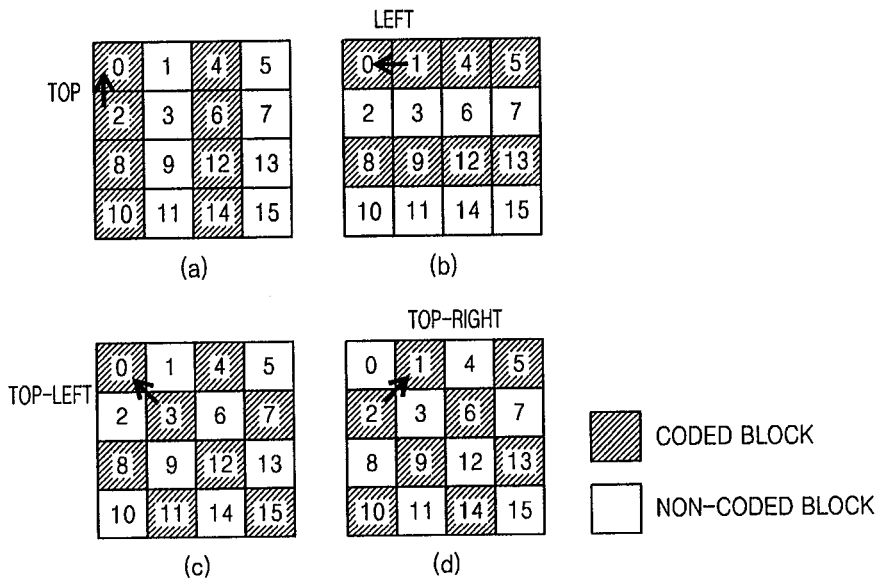
FIG. 5 illustrates an example of entropy encoding of an encoder for redundant slice coding by PD according to an embodiment of the present invention.

FIG. 5 illustrates a view for explaining entropy encoding in an encoder for redundant slice coding by PD according to an embodiment of the present invention.

To maintain coding efficiency while providing error resilience, some of the four sections of a residual block that undergoes PD are transformed and quantized and then, encoded by the entropy encoding unit 140.

In FIG. 5, two of the four sections of the residual block are selectively transformed and quantized, and then encoded.

FIG. 5(*a*) illustrates encoding for a case where a second quadrant section 410 and a third quadrant section 430 of FIG. 4A are transformed and quantized by the quantization transform unit 120.

In this case, a neighboring block available to the entropy encoding unit 140 is only a top neighboring block. In other words, the number of non-zero transform coefficient levels is predicted from the top neighboring block.

FIG. 5 (*b*) illustrates encoding for a case where a first quadrant section 420 and a second quadrant section 410 are transformed and quantized by the quantization transform unit 120.

In this case, a neighboring block that is available to the entropy encoding unit 140 is only a left neighboring block. In other words, the number of non-zero transform coefficient levels is predicted from the left neighboring block.

FIG. 5 (*c*) illustrates encoding for a case where the second quadrant section 410 and a fourth quadrant section 440 are transformed and quantized by the quantization transform unit 120.

In this case, a neighboring block that is available to the entropy encoding unit 140 is only a top-left neighboring block. In other words, the number of non-zero transform coefficient levels is predicted from the top-left neighboring block.

FIG. 5 (*d*) illustrates encoding for a case where the first quadrant section? 420 and the fourth quadrant section 440 are transformed and quantized by the quantization transform unit 120.

In this case, a neighboring block available to the entropy encoding unit 140 is only a top-right neighboring block. In other words, the number of non-zero transform coefficient levels is predicted from the top-right neighboring block.

FIG. 6 illustrates the reconstruction concept of a pixel in redundant slice coding by PD, according to an embodiment of the present invention. The reference block generation unit performs pixel reconstruction in redundant slice coding by PD.

In the current frame illustrated in FIG. 6, a gray pixel indicates a pixel that is reconstructed after being coded, a white pixel indicates a pixel that is not coded, and a dotted pixel 630 indicates a pixel reconstructed by a prediction based on a previous frame and a spatially neighboring pixel.

Since all the sections of the residual block are not coded, if reconstruction is not easy due to an error or a loss during reconstruction of a redundant slice that is not coded or transmission of a sequence, the value of a pixel that is not coded is predicted to be a first preliminary reconstruction value 620 based on previously predicted coded pixels 610.

A second preliminary reconstruction value is estimated based on the average of the values of the coded pixels 631, 632, 633, and 634 adjacent to the pixel 630 that is not coded.

A difference between the first preliminary reconstruction value 620 and the second preliminary reconstruction value is obtained. If the difference is less than a predetermined threshold, the first preliminary reconstruction value 620 is used as a reconstruction value. Otherwise, the second preliminary reconstruction value is used as a reconstruction value.

FIG. 7 illustrates a change in a picture parameter set RBSP syntax according to an embodiment of the present invention.

In the encoder using PD according to an embodiment of the present invention, a new syntax redundant_pic_type is immediately added after the redundant_pict_cnt_present_flag syntax of a picture parameter set RBSP syntax (S.7.3.2.2) as illustrated in 710 of FIG. 7.

A change in semantics is made as follows. Redundant_pic_type specifies a redundant slice coding method. The value of redundant_pic_type is an integer ranging between 0 and 1. When a new redundant slice coding method is used, the range of the value of redundant_pic_type may increase.

If redundant_pic_type is 0, it means that a redundant picture is coded by simply repeating a primary picture. If redundant_pic_type is 1, it means that the redundant picture is coded by PD according to the present invention.

FIG. 8 illustrates an indication of redundant_pic_type in a JSVM encoder configuration file. As shown in FIG. 8, to indicate a redundant slice coding method, a new entry is added at the end of the JSVM encoder configuration file.

Figure 9A:
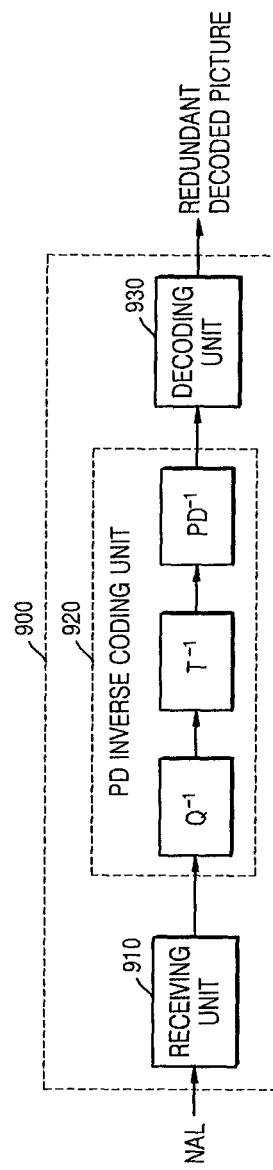
FIGS. 9A and 9B are block diagrams illustrating decoders for redundant slice coding by PD according to an embodiment of the present invention.
Figure 9B:
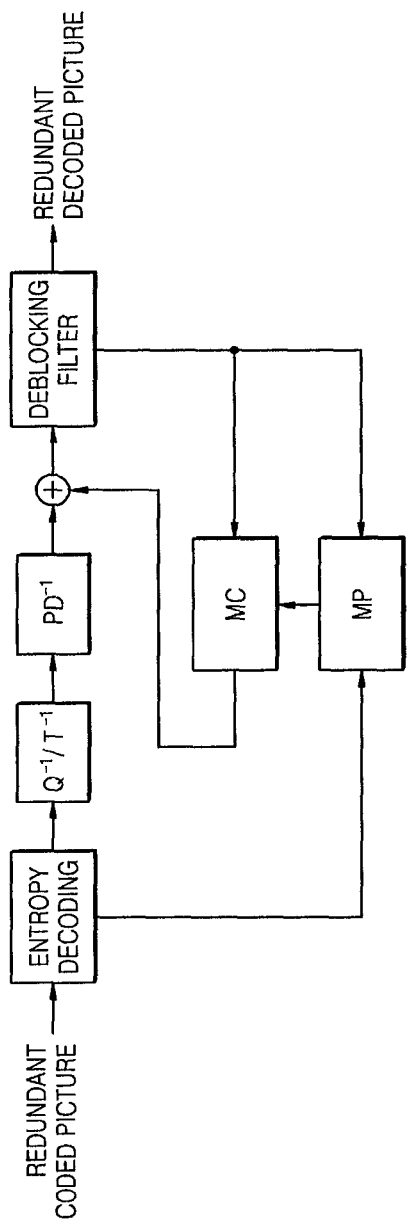

FIGS. 9A and 9B are block diagrams illustrating decoders for redundant slice coding by PD according to an embodiment of the present invention.

FIG. 9A is a conceptual view of a decoder 900 for redundant slice coding by PD according to an embodiment of the present invention. The decoder 900 includes a receiving unit 910, a PD inverse coding unit 920, and a decoding unit 930.

The receiving unit 910 receives a bitstream including a coefficient that is obtained by rearranging a residual block into four sections by PD and performing transform and quantization and then, entropy encoding on at least one of the sections of an encoder. More specifically, the receiving unit 910 receives the bitstream transmitted from the entropy encoding unit 140 illustrated in FIG. 1 and transmits the bitstream to the PD inverse coding unit 920.

The PD inverse coding unit 920 of the decoder 900 performs entropy decoding, inverse quantization, and inverse transform on the bitstream and then, reconstructs the at least one section by inverse PD.

A conventional decoder performs reconstruction with all encoded blocks transmitted from an encoder, but in the present invention, an encoder performs PD and transmits only a block that is selectively transformed and quantized according to the state of a bandwidth and then, entropy-encoded to the decoder 900 and the PD inverse coding unit 920 of the decoder 900 reconstructs the transmitted block.

The decoding unit 930 reconstructs the sections of the residual block that are not received from the encoder based on the at least one section reconstructed by the PD inverse coding unit 920 and a previously decoded frame (or field).

FIG. 9B is a block diagram of an example of a decoder for redundant slice coding by PD according to an embodiment of the present invention.

Figure 10:
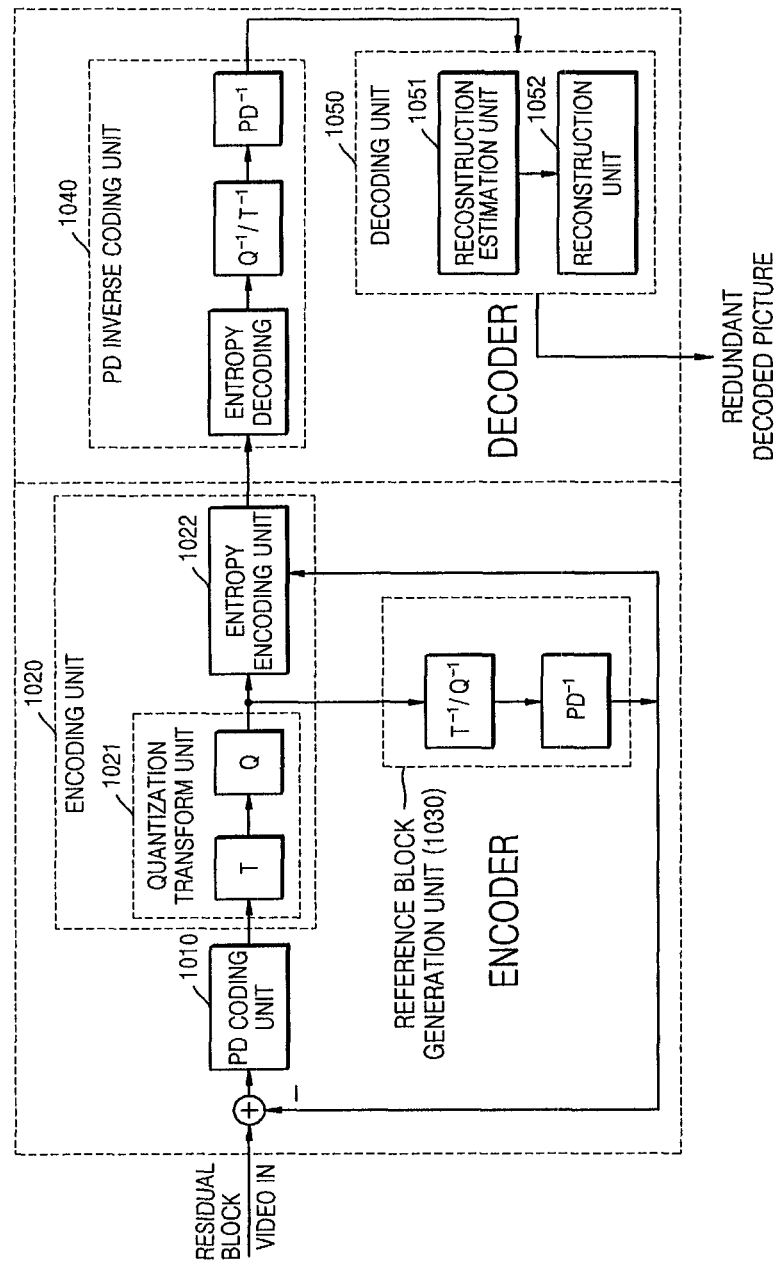
FIG. 10 is a block diagram of a codec for redundant slice coding by PD according to an embodiment of the present invention.

FIG. 10 is a block diagram of a codec for redundant slice coding by PD according to an embodiment of the present invention.

The codec roughly includes an encoder and a decoder.

The encoder rearranges a residual block into four sections by performing PD, transforms, quantizes, and entropy-encodes some of the sections, and transmits the result to the decoder.

The decoder reconstructs the sections that are not coded based on a bitstream including the at least one section that is encoded, which is received from the encoder.

The encoder includes a PD coding unit 1010, an encoding unit 1020, and a reference block generation unit 1030, and the decoder includes a PD inverse coding unit 1040 and a decoding unit 1050.

The PD coding unit 1010 rearranges the residual block into four sections by performing PD on the residual block. The encoding unit 1020 sequentially transforms, quantizes, and entropy-encodes at least one of the four sections for encoding.

The reference block generation unit 1030 generates a reference block based on a value obtained by performing inverse quantization and inverse transform and then, inverse PD on the at least one section that is transformed and quantized.

The PD inverse coding unit 1040 of the decoder performs entropy-decoding, inverse quantization, inverse transform, and then inverse PD on the at least one section that is coded. The decoding unit 1050 reconstructs the sections that are not encoded based on the at least one section that is reconstructed by the PD inverse coding unit 1040 and a previously decoded frame (or field).

More specifically, the decoding unit 1050 includes a reconstruction estimation unit 1051 and a reconstruction unit 1052.

The reconstruction estimation unit 1051 estimates a first preliminary reconstruction value of the pixels of the sections that are not encoded using a previously decoded frame (or field) and a second preliminary reconstruction value based on the average of the values of the pixels of the encoded section, which are adjacent to the pixels of the sections that are not encoded.

If a difference between the first preliminary reconstruction value and the second preliminary reconstruction value is greater than a predetermined threshold, the reconstruction unit 1052 sets the second preliminary reconstruction value as the values of the pixels of the sections that are not encoded. Otherwise, the reconstruction unit 1052 sets the first preliminary reconstruction value as the values of the pixels of the sections that are not encoded.

Figure 11:
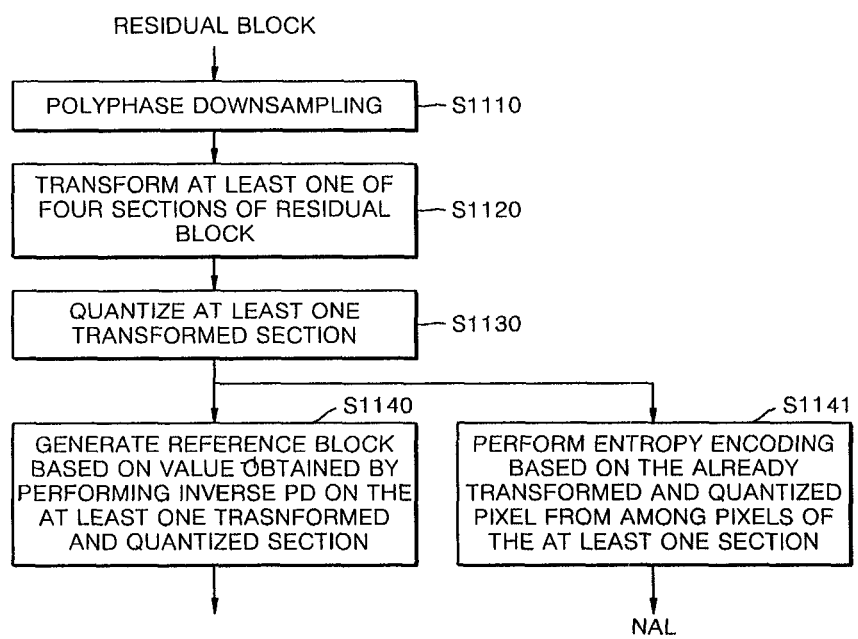
FIG. 11 is a flowchart illustrating a redundant slice coding method by PD of an encoder according to an embodiment of the present invention.

FIG. 11 is a flowchart illustrating a redundant slice coding method by PD of an encoder according to an embodiment of the present invention.

Referring to FIG. 11, after PD is performed on a residual block that is a difference between the current block and a prediction block, the residual block is rearranged into four sections in operation S1110. A discrete cosine transform (DCT) is performed on at least one of the sections in operation S1120. In this case, one to four sections can be selected for DCT based on the state of a bandwidth.

The at least one section that undergoes DCT is quantized in operation S1130.

In a reconstruction path of the encoder, a reference block is generated based on a value obtained by performing inverse transform, inverse quantization, and then inverse PD on the at least one section in operation S1140.

In this case, the values of the pixels of the sections that are not transformed and quantized in operation S1120 are set to 0, the values of the pixels of the at least one transformed and quantized section to the value obtained by performing inverse transform, inverse quantization, and then inverse PD on the at least one section, and the resulting residual block is added to a motion-compensated prediction block to generate a reference block in operation S1140.

Entropy encoding is performed based on the already transformed and quantized pixels from among the pixels of the at least one section in operation S1141.

Figure 12:
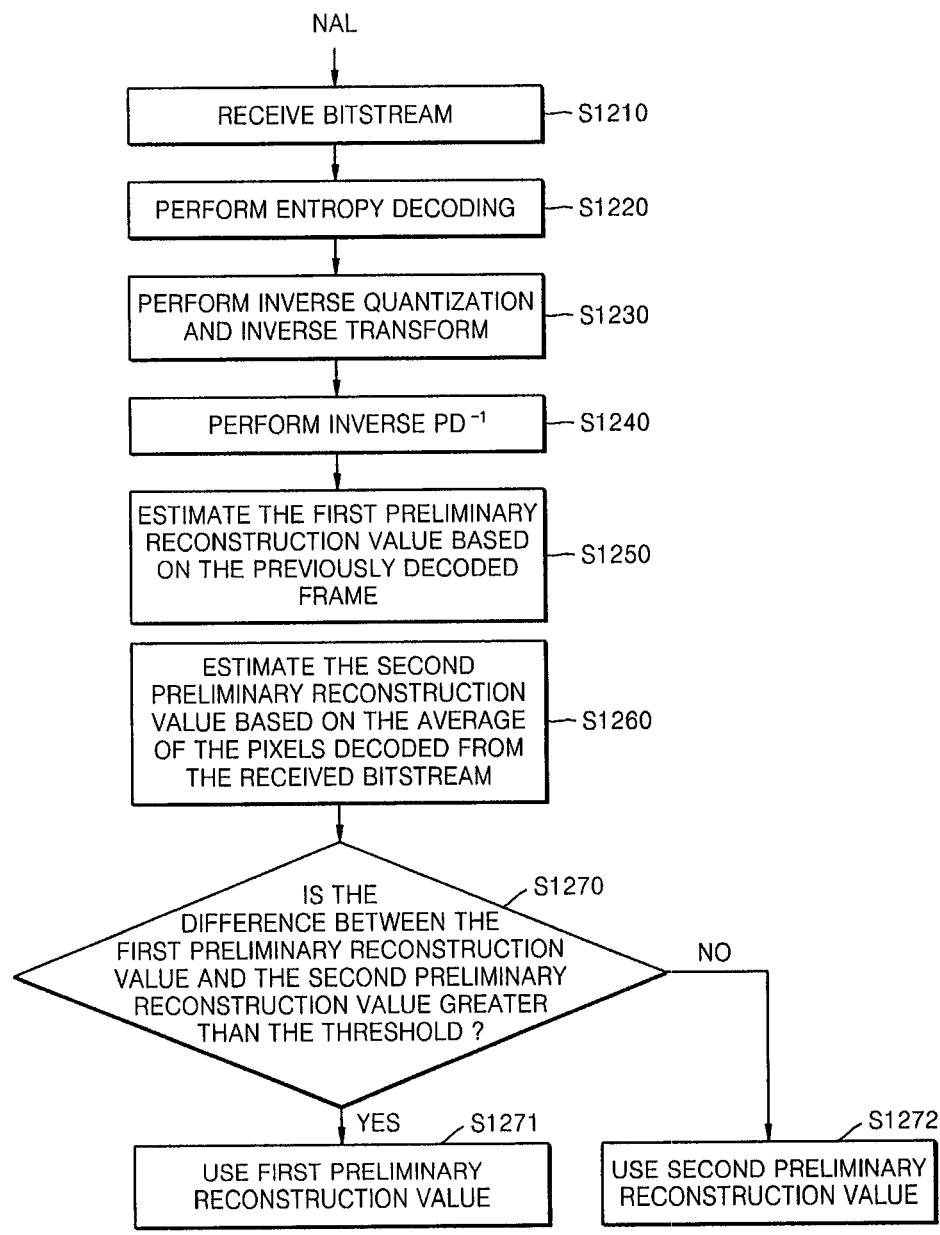
FIG. 12 is a flowchart illustrating redundant slice coding method by PD of a decoder according to an embodiment of the present invention.

FIG. 12 is a flowchart illustrating a redundant slice coding method by PD of a decoder according to an embodiment of the present invention.

A bitstream including a coefficient obtained by rearranging a residual block into four sections by PD and performing transform and quantization, and then entropy encoding on at least one of the sections is received from an encoder in operation S1210.

Entropy decoding is performed on the received bitstream in operation S1220 and inverse quantization and inverse transform are performed on the entropy-decoded bitstream in operation S1230. Inverse PD is performed on at least one section that under goes PD at the encoder in operation S1240.

After inverse PD, the sections of the residual block that are not transmitted from the encoder are reconstructed based on the at least one section reconstructed in operation S1240 and a previously decoded frame in operations S1250-S1272.

Reconstruction is performed as follows.

A first preliminary reconstruction value of the values of the pixels of the sections that are not received from the encoder is estimated using the previously decoded frame in operation S1250 and a second preliminary reconstruction value is estimated based on the average of the values of the pixels of the at least one reconstructed section, which are adjacent to the pixels of the sections that are not received from the encoder in operation S1260.

It is determined whether a difference between the first preliminary reconstruction value and the second preliminary reconstruction value is greater than a predetermined threshold in operation S1270. If the difference between the first preliminary reconstruction value and the second preliminary reconstruction value is greater than the predetermined threshold, the second preliminary reconstruction value is set as the values of the pixels of the sections that are not received from the encoder in operation S1271.

Unless the difference between the first preliminary reconstruction value and the second preliminary reconstruction value is greater than the predetermined threshold, the first preliminary reconstruction value is set as the values of the pixels of the sections that are not received from the encoder in operation S1272.

Figure 13:
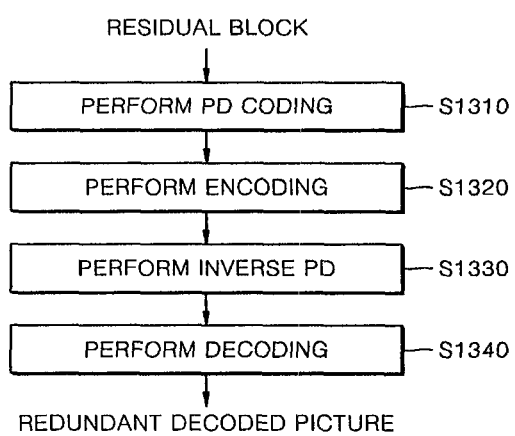
FIG. 13 is a flowchart illustrating redundant slice coding method by PD of an encoder and a decoder according to an embodiment of the present invention.

FIG. 13 is a flowchart illustrating a redundant slice coding method by PD of an encoder and a decoder according to an embodiment of the present invention.

Referring to FIG. 13, PD is performed on a residual block by rearranging the residual block into four sections at the encoder in operation S1310. Then, transform, quantization, and entropy coding are sequentially performed on at least one of the four sections for encoding in operation S1320.

The at least one encoded section is transmitted to the decoder and the decoder performs entropy-decoding, inverse quantization and inverse transform, and then inverse PD based on a received bitstream in operation S1330.

The sections that are not encoded by the encoder are reconstructed based on the at least one section that is reconstructed by PD and a previously decoded frame in operation S1340.

FIGS. 14A through 19 illustrate experiment results on the improved performance of redundant slice coding by PD according to an embodiment of the present invention.

To compare the performances of an error-free case, a case where a redundant picture is generated using a QP value, and by redundant slice coding by PD according to the present invention is compared by carrying out a simulation based on reference software of H.264, i.e., JM10.1. The Foreman and New images have a Quarter Common Intermediate Format (QCIF) size and a Stefan image has a Common Intermediate Form at (CIF) size. All experimental images are encoded by inserting a redundant picture between every 2 sheets for an IPPP structure. An intra period is 1 second, the number of reference frames is 5, context adaptive variable length coding (CAVLC) is used as an arithmetic coding method, and rate-distortion optimization is an ON state. Packet loss rates (PLRs) of 3%, 5%, 10%, and 20% are applied to an encoded bitstream at random and corresponding peak signal to noise ratios (PSNRs) are measured.

Figure 14A:
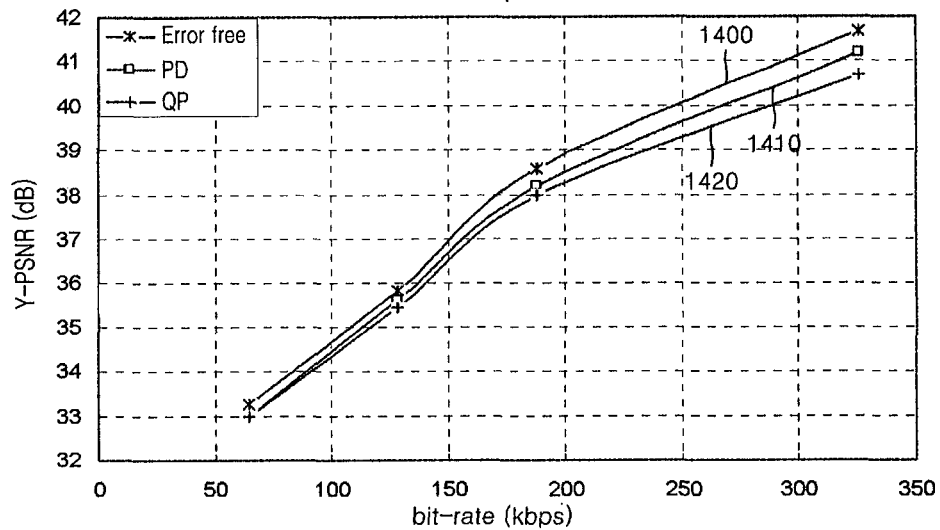
FIGS. 14A and 14B illustrate a comparison between the performance of redundant slice coding by PD, according to an embodiment of the present invention, and the rate distortion (RD) performance of quantization parameter (QP)-based coding in an environment having an error, according to an embodiment of the present invention.
Figure 14B:
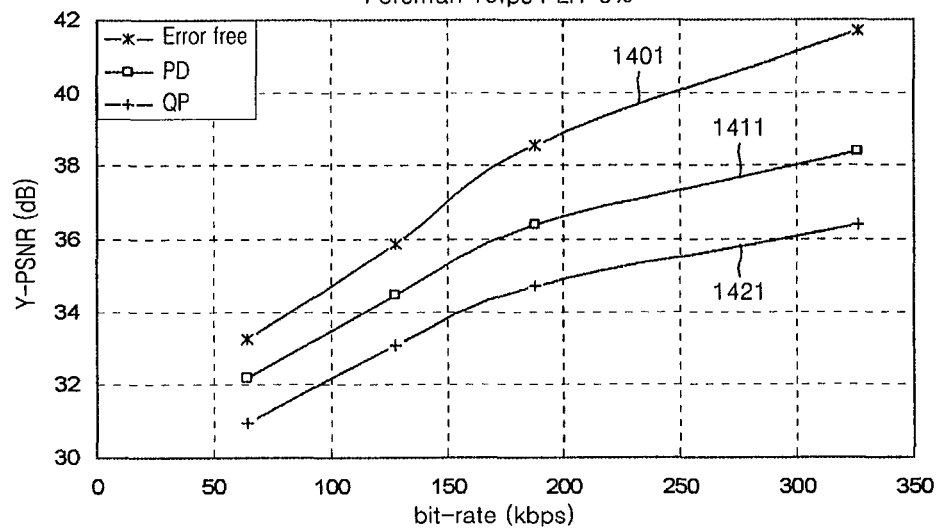
Figure 15D:
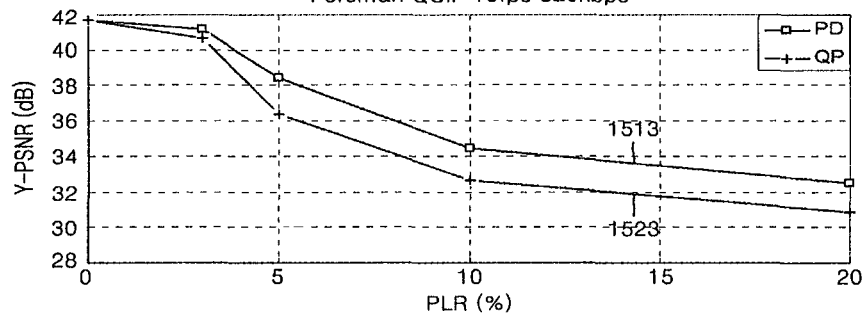

In FIGS. 14A and 14B, the performance of redundant slice coding by PD according to the present invention and the RD performance of QP-based coding are compared for a case having an error.

In FIGS. 14A and 14B, the RD performances of redundant slice coding 1410 and 1411 by PD according to the present invention and QP-based coding 1420 and 1421 are compared for a case having an error in a Foreman sequence.

When a PLR is low (as in FIG. 14A), for example 3%, redundant slice coding 1410 by PD according to the present invention exhibits slightly improved performance. However, when the PLR is high (as in FIG. 14B), for example 5%, redundant slice coding 1411 by PD according to the present invention exhibits an improved peak signal to noise ratio (PSNR) between 1.1 dB and 2 dB as compared to QP-based coding 1421. In other words, as a PLR increases, a gap between coding according to the present invention and conventional coding is widened.

In FIGS. 15A through 15D, in an environment having an error (Foreman, QCIF, and 10 fps) the performance of redundant slice coding by PD according to the present invention and the performance of QP-based coding are compared, according to an embodiment of the present invention.

In FIGS. 15A through 15D, simulation results according to different bitrates are shown in a Foreman sequence. In this case, FIGS. 15A through 15D show experiment results for bitrates of 64 kbps, 128 kbps, 192 kbps, and 320 kbps.

It can be seen from FIGS. 15A through 15D that redundant slice coding 1510, 1511, 1512, and 1513 by PD have a better reconstruction quality than QP-based coding 1520, 1521, 1522, and 1523 in terms of PSNR.

In each case, as the PLR increases, redundant slice coding by PD according to the present invention can still achieve better performing results than QP-based coding.

Figure 16:
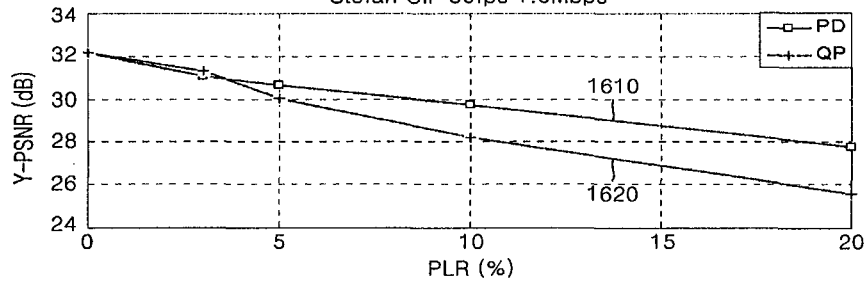
FIG. 16 illustrates a comparison between the performance of redundant slice coding by PD, according to an embodiment the present invention, and the performance of QP-based coding in an environment having an error (Stefan, CIF, 30 fps, 10 Mbps), according to an embodiment of the present invention.

In FIG. 16, in an environment having an error (Stefan, CIF, 30 fps, 10 Mbps), the performance of redundant slice coding by PD and the performance of QP-based coding are compared, according to an embodiment of the present invention.

Improvement in performance, as illustrated in FIGS. 14A through 15D, can also be seen in a Stefan sequence. In other words, as illustrated in FIG. 16, if a transmission environment deteriorates, redundant slice coding by PD according to the present invention provides a gradually decreasing curve with respect to the quality of a reconstructed picture as compared to QP-based coding.

In FIG. 16, when PLR is 3%, QP-based coding shows better performing results than the present invention by about 0.1 dB. However, this is a rare case for decoding of redundant slice coding by PD when the PLR is low. In general, redundant slice coding by PD exhibits better performance when compared to QP-based coding.

Figure 17:
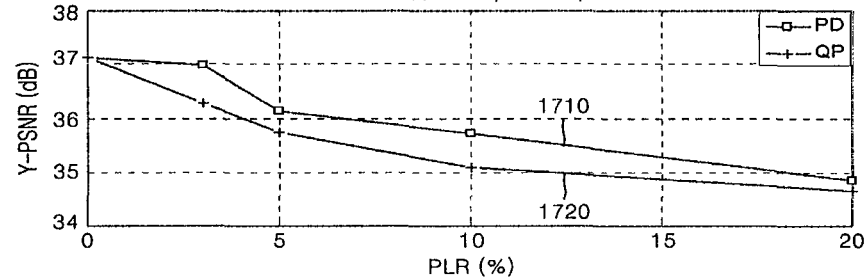
FIG. 17 illustrates a comparison between the performance of redundant slice coding by PD, according to an embodiment of the present invention and the performance of QP-based coding in an environment having an error (News, QCIF, 10 fps, 64 Kbps), according to an embodiment of the present invention.

In FIG. 17, in an environment having an error (News, QCIF, 10 fps, 64 Mbps), the performance of redundant slice coding by PD and the performance of QP-based coding are compared, according to an embodiment of the present invention.

As illustrated in FIG. 17, the error resilience of H.264 in a packet loss environment can obtain a PSNR improvement of 1.6 dB through redundant slice coding by PD according to the present invention as compared to QP-based coding.

Figure 18A:
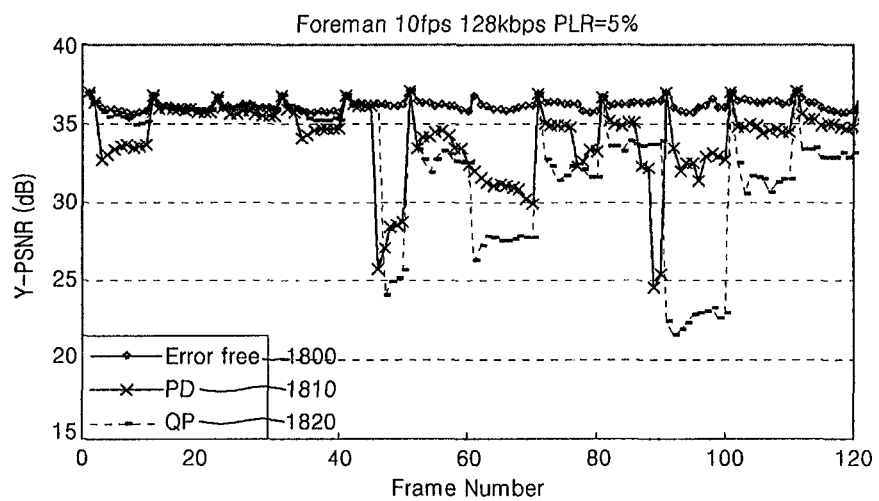
FIGS. 18A and 18B illustrate a comparison between the performance of redundant slice coding by PD, according to an embodiment of the present invention, and the PSNR performance of QP-based coding in an environment having an error, according to an embodiment of the present invention.
Figure 18B:
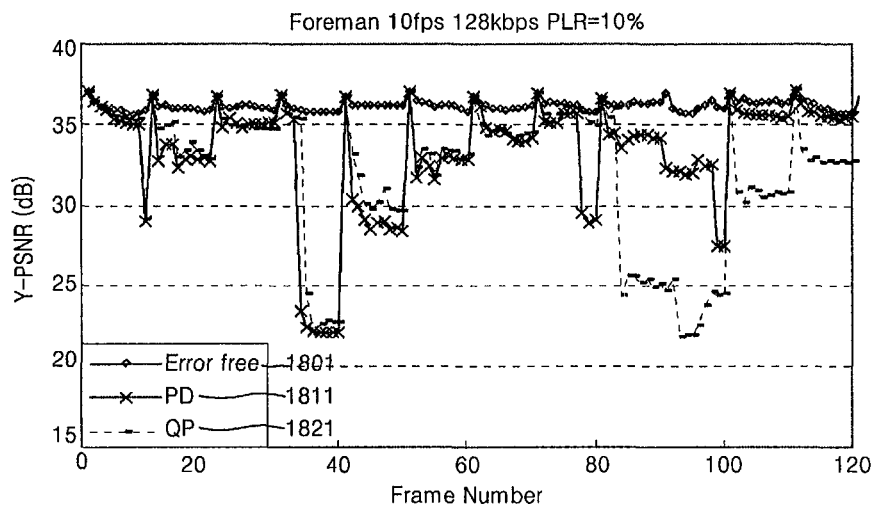

In FIGS. 18A and 18B, in an environment having an error, the performance of redundant slice coding by PD and the PSNR performance of QP-based coding are compared, according to an embodiment of the present invention.

FIG. 18A illustrates an experiment result of an environment 1800 without an error, redundant slice coding 1810 by PD, and QP-based coding 1820 in the case of Foreman, 10 fps, 128 kbps, and PLR=5%.

FIG. 18B shows an experiment result of an error-free environment 1801, redundant slice coding 1811 by PD, and QP-based coding 1821 in the case of Foreman, 10 fps 128 kbps, and PLR=10%.

In order to illustrate improved error resilience of H.264, FIG. 11 illustrates in detail PSNR performing results of redundant slice coding by PD and QP-based coding in frame units.

It can be seen from experiment results that redundant slice coding by PD according to the present invention exhibits better performance than QP-based coding for all the time.

FIGS. 19A through 19C illustrates the qualities of reconstructed pictures in a Foreman sequence in the case of PLR=10%, according to an embodiment of the present invention.

FIG. 19A illustrates the display quality of a reconstructed picture in an error-free environment, FIG. 19B shows the display quality of a reconstructed picture using QP-based coding, and FIG. 19C illustrates the display quality of a reconstructed picture using redundant slice coding by PD.

It can be noticed from a decoded picture that redundant slice coding by PD according to the present invention provides improved display quality as compared to QP-based coding.

The present invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An encoder for redundant slice coding by polyphase down-sampling (PD), the encoder comprising:
   a PD coding unit rearranging a residual block that is a difference between a current block and a prediction block into a plurality of sections by performing PD on the residual block;
   a quantization transform unit transforming and quantizing at least one of the plurality of sections of the residual block; and
   a reference block generation unit generating a reference block based on a value obtained by performing inverse transform and inverse quantization, and then inverse PD on the at least one transformed and quantized section by the quantization transform unit.

2. The encoder of claim 1, wherein the reference block generation unit sets the values of the pixels of sections that are not transformed and quantized by the quantization transform unit to 0, sets the values of the pixels of the at least one section that is transformed and quantized by the quantization transform unit to the value obtained by performing inverse transform and inverse quantization, and then inverse PD on the transformed and quantized section, and adds the residual block to a prediction block to generate the reference block.

3. The encoder of claim 1, further comprising an entropy encoding unit performing entropy encoding based on a previously transformed and quantized pixel from among the pixels of the at least one section.

4. The encoder of claim 1, wherein the PD coding unit rearranges the residual block into four sections.

5. A decoder for redundant slice coding by polyphase down-sampling (PD), the decoder comprising:
   a receiving unit receiving a bitstream including a coefficient that is obtained by rearranging a residual block into a plurality of sections by PD coding and performing transform and quantization, and then entropy encoding on at least one of the plurality of sections of the residual block from an encoder;
   a PD inverse coding unit performing entropy-decoding, inverse quantization, and inverse transform on the bitstream and performing inverse PD on the at least one section of the residual block for reconstruction; and
   a decoding unit reconstructing sections of the residual block which are not received from the encoder based on the at least one section reconstructed by the PD inverse coding unit and a previously decoded frame.

6. The decoder of claim 5, wherein the decoding unit comprises:
   a reconstruction estimation unit estimating a first preliminary reconstruction value that is a reconstruction value of a value of a pixel of the sections that are not received from the encoder using the previously decoded frame and estimating a second preliminary reconstruction value based on the average of the values of the pixels of the at least one section, which are adjacent to the pixel of the sections that are not received from the encoder; and a reconstruction unit setting the second preliminary reconstruction value as a reconstruction value of the pixel of the sections that are not received from the encoder if a difference between the first preliminary reconstruction value and the second preliminary reconstruction value is greater than a predetermined threshold, and sets the first preliminary reconstruction value as the reconstruction value of the pixel of the sections that are not received from the encoder if the difference is less than the predetermined threshold.

7. The decoder of claim 5, wherein the plurality of sections are four sections.

8. A codec for redundant slice coding by polyphase down-sampling (PD), the codec comprising:
   a PD coding unit rearranging a residual block into a plurality of sections by performing PD coding on the residual block;
   a coding unit performing coding by sequentially performing a transform, quantization, and entropy-coding on at least one of the plurality of sections;
   a PD inverse coding unit performing entropy-decoding, inverse quantization, and inverse transform, and then inverse PD on the at least one encoded section; and
   a decoding unit reconstructing sections of the residual block that are not encoded based on the at least one section that is reconstructed by the PD inverse coding unit and a previously decoded frame.

9. The codec of claim 8, further comprising a reference block generation unit generating a reference block based on a value obtained by performing inverse transform and inverse quantization, and then inverse PD coding on the at least one transformed and quantized section.

10. The codec of claim 9, wherein the reference block generation unit sets the values of the pixels of the sections that are not transformed and quantized by the quantization transform unit to 0, sets the values of the pixels of the at least one section that is transformed and quantized by the quantization transform unit to the value obtained by performing inverse transform and inverse quantization, and then inverse PD on the transformed and quantized section, and adds the residual block to a prediction block to generate the reference block.

11. The codec of claim 8, wherein the encoding unit comprises:
   a quantization transform unit transforming and quantizing at least one of the sections of the residual block; and
   an entropy encoding unit performing entropy encoding based on a previously transformed and quantized pixel from among the pixels of the at least one section of the residual block.

12. The codec of claim 8, wherein the decoding unit comprises:
   a reconstruction estimation unit estimating a first preliminary reconstruction value that is a reconstruction value of a value of a pixel of the sections that are not received from the encoder using the previously decoded frame and estimating a second preliminary reconstruction value based on the average of the values of the pixels of the at least one section, which are adjacent to the pixel of the sections that are not received from the encoder; and
   a reconstruction unit setting the second preliminary reconstruction value as a reconstruction value of the pixel of the sections that are not received from the encoder if a difference between the first preliminary reconstruction value and the second preliminary reconstruction value is greater than a predetermined threshold, and sets the first preliminary reconstruction value as the reconstruction value of the pixel of the sections that are not received from the encoder if the difference is less than the predetermined threshold.

13. A method for redundant slice coding by polyphase down-sampling (PD), the method comprising:
   rearranging a residual block that is a difference between a current block and a prediction block into a plurality of sections by performing PD on the residual block;
   transforming at least one of the plurality of sections;
   quantizing the at least one transformed section; and
   generating a reference block based on a value obtained by performing inverse transform and inverse quantization, and then inverse PD on the at least one transformed and quantized section.

14. The method of claim 13, wherein the generation of the reference block comprises setting the values of the pixels of sections that are not transformed and quantized to 0, setting the values of the pixels of the at least one section that is transformed and quantized to the value obtained by performing inverse transform and inverse quantization, and then inverse PD on the transformed and quantized section, and adding the residual block to a prediction block.

15. The method of claim 13, further comprising performing entropy encoding based on a previously transformed and quantized pixel from among the pixels of the at least one section.

16. The method of claim 13, wherein the residual block is rearranged into four blocks.

17. A method for redundant slice decoding by polyphase down-sampling (PD), the method comprising:
   receiving a bitstream including a coefficient that is obtained by rearranging a residual block into four sections by PD and performing transform and quantization, and then entropy encoding on at least one of the sections from an encoder;
   performing inverse PD on the at least one section after performing entropy-decoding and inverse quantization, and inverse transform on the bitstream; and
   reconstructing sections of the residual block which are not received based on the at least one section on which the transform and quantization and the entropy encoding have been performed and a previously decoded frame.

18. The method of claim 17, wherein the reconstruction of the sections comprises:
   estimating a first preliminary reconstruction value that is a reconstruction value of a value of a pixel of the sections that are not received using the previously decoded frame and estimating a second preliminary reconstruction value based on the average of the values of the pixels of the at least one section, which are adjacent to the pixel of the sections that are not received;
   determining whether a difference between the first preliminary reconstruction value and the second preliminary reconstruction value is greater than a predetermined threshold;
   setting the second preliminary reconstruction value as a reconstruction value of the pixel of the sections that are not received if the difference is greater than the predetermined threshold; and
   setting the first preliminary reconstruction value as the reconstruction value of the pixel of the sections that are not received if the difference is less than the predetermined threshold.

19. A method for redundant slice coding by polyphase down-sampling (PD), the method comprising:
- rearranging a residual block into a plurality of sections by performing PD on the residual block;
- performing encoding by sequentially performing transform, quantization, and entropy-coding on at least one of the plurality of sections;
- performing inverse PD after performing the entropy-decoding, inverse quantization, and inverse transform on the at least one encoded section; and
- reconstructing sections of the residual block which are not encoded based on at least one reconstructed section and a previously decoded frame.

20. The method of claim 19, further comprising generating a reference block based on a value obtained by performing inverse PD after performing inverse transform and inverse quantization on the at least one transformed and quantized section.

21. The method of claim 20, wherein the generating of the reference block comprises setting the values of the pixels of sections that are not transformed and quantized by the quantization transform unit to 0, setting the values of the pixels of the at least one transformed and quantized section to the values obtained by performing inverse transform and inverse quantization, and then inverse PD on the transformed and quantized section, and adding the residual block to a prediction block to generate the reference block.

22. The method of claim 19, wherein the performing of encoding comprises:
- transforming and quantizing at least one of the plurality of sections of the residual block; and
- performing entropy encoding based on a previously transformed and quantized pixel from among the pixels of the at least one section.

23. The method of claim 19, wherein the reconstructing comprises:
- estimating a first preliminary reconstruction value that is a reconstruction value of a value of a pixel of the sections that are not received using the previously decoded frame and estimating a second preliminary reconstruction value based on the average of the values of the pixels of the at least one section, which are adjacent to the pixel of the sections that are not received; and
- setting the second preliminary reconstruction value as a reconstruction value of the pixel of the sections that are not received if a difference between the first preliminary reconstruction value and the second preliminary reconstruction value is greater than a predetermined threshold, and sets the first preliminary reconstruction value as the reconstruction value of the pixel of the sections that are not received if the difference is less than the predetermined threshold.

24. The method of claim 19, wherein the rearranging of the residual block comprises rearranging the residual block into a plurality of sections by performing PD on the residual block.

25. A non-transitory computer-readable recording medium having recorded thereon a program for implementing a method of any one of claims 13 through 24.

26. The encoder of claim 1, wherein the reference block generation unit sets the values of all the pixels of sections of the residual block that are not transformed and quantized to a predetermined value, and adds the residual block to a prediction block to generate the reference block.

* * * * *